United States Patent [19]

Mitchell et al.

[11] Patent Number: 4,929,497

[45] Date of Patent: May 29, 1990

[54] FLAME RETARDANT ROLLING DOOR

[75] Inventors: Larry L. Mitchell, Homer; Crayton G. Toney, McGraw, both of N.Y.

[73] Assignee: Albany International Corp., Menands, N.Y.

[21] Appl. No.: 329,020

[22] Filed: Mar. 27, 1989

[51] Int. Cl.[5] .......................... B32B 7/00; B32B 25/00

[52] U.S. Cl. .................................... 428/265; 428/266; 428/267; 428/921

[58] Field of Search ............... 428/265, 267, 921, 262, 428/266

[56] References Cited

U.S. PATENT DOCUMENTS

| | | | |
|---|---|---|---|
| 4,551,493 | 11/1985 | Blinne et al. | 524/89 |
| 4,594,286 | 6/1986 | McKinney et al. | 428/265 |

FOREIGN PATENT DOCUMENTS

| | | | |
|---|---|---|---|
| 0142847 | 8/1983 | Japan | 428/921 |
| 0172525 | 9/1984 | Japan | 428/921 |
| 2068825 | 3/1987 | Japan | 428/921 |

*Primary Examiner*—Marion C. McCamish
*Attorney, Agent, or Firm*—Kane, Dalsimer, Sullivan, Kurucz, Levy, Eisele & Richard

[57] ABSTRACT

This invention consists of a flame-retardant, coated fabric material for use in the manufacture of rolling-door panels, blades, or leaves. It is particularly designed for use in the kind of high-speed, light-weight doors currently found in the garages and vehicle bays of warehouses, factories, and other industrial facilities. In addition to being much lighter than the metal doors being replaced, the material of the present invention has to its further advantage a flame-retardancy not present in earlier fabric doors.

20 Claims, 1 Drawing Sheet

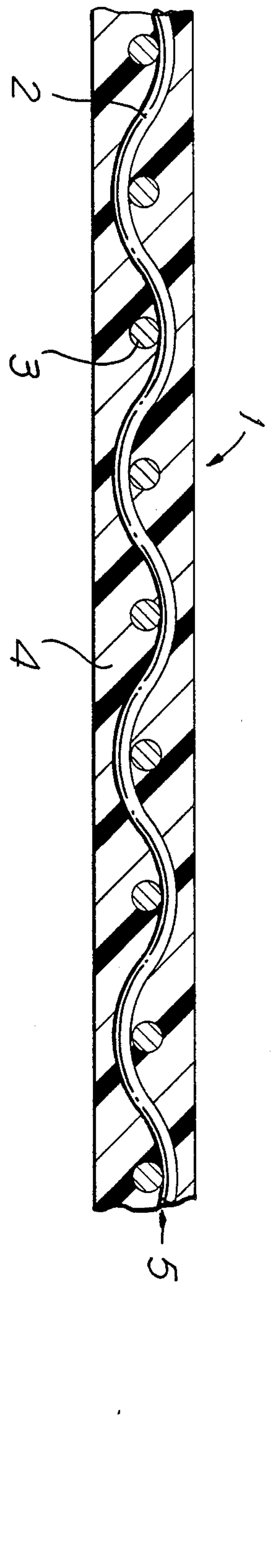
2
3
1
4
5

FLAME RETARDANT ROLLING DOOR

BACKGROUND OF THE INVENTION

1. Field of the invention

This invention relates to the use of fabric materials in the manufacture of rolling doors and door blades. More specifically, the invention teaches the use of fireproof yarns and coatings in the production of the door panels, blades or leaves.

2. Description of the Related Art

This invention generally relates to the production of light-weight garage-type doors used in warehouses, industrial facilities, and the like. With the goal of reducing costs associated with heating such large buildings and rooms, interest in doors that could be opened and closed in a minimal time developed. Fabric composites appeared as an alternative to metal for the actual door panel. Their light weight allows for quick operation at a lower cost than that associated with a metal door.

Doors of this variety have been made in two forms. The first, a rolling door, is conceptually much like a window shade. When opened, the pliable single-piece door leaf is pulled upward into a roll above and parallel to the upper horizontal edge of the door opening. The other form is that of a door composed of a number of non-pliable horizontal blades or sections joined together. Each section can be visualized as basically an elongated rectangle whose longer dimension is approximately equal to the width of the door opening. Assembled by joining a suitable number together with the longer dimension horizontal in the finished product, this door operates on a familiar track arrangement, such that when opened, it lies parallel and adjacent to the surface of the ceiling.

The introduction of fabrics poses a new hazard not present with metal doors - that of fire. The success and future potential of these light-weight doors heightens the need for fireproof or flame-retardant fabric materials. That need is satisfied by the invention disclosed and described below.

SUMMARY OF THE INVENTION

The flame-retardant rolling-door panels, blades or leaves of the present invention are produced by applying flame-retardant coatings to base fabrics woven from flame-retardant monofilament yarns.

The monofilament yarns used in the weaving operation are preferably of polyester containing flame-retardant additives. These additives, in addition to their flame-retardant properties, allow the yarn to be extruded at a lower temperature than that normally required for polyester monofilament.

Once the fabric is woven, it is given a flame-retardant coating which provides, in addition to a further degree of fireproofing, increased bulk, stiffness, and rigidity to the material. Polyvinylchloride, silicone rubber, and acrylics can be used as coatings. Additional flame-retardant material can be mixed with the coatings for further protection.

This invention provides the advantages that neither yarn nor coating support combustion. Both the yarn and the final door structure are non-dripping and self-extinguishing. Finally, as noted above, the polymer blend used to produce the monofilament yarn can be extruded at low temperatures.

BRIEF DESCRIPTION OF THE DRAWINGS

The FIGURE presents a view, in cross section, of the coated, woven base fabric used to make the rolling-door panels, blades, or leaves of the present invention.

DETAILED DESCRIPTION OF THE PREFERRED EMBODIMENTS

Turning now to the FIGURE one is shown generally a section 1 of a coated, woven base fabric 5 used for the flame-retardant rolling-door panels, blades or leaves of the present invention. In this enlarged cross-sectional view, warp strands 2 interweave with weft strands 3 in a plain weave pattern. It is not to be assumed, however, that the base fabrics 5 required for the practice of this invention must be so woven; other weave patterns can equally be used with the same beneficial result. Also shown in The FIGURE is the coating 4, which gives the base fabric 5 added thickness, stiffness and bulk as well as contributing to its fireproofing and flame-retardant characteristics.

With reference first to the monofilament yarns required for the weaving of the base fabric 5, polyester with flame-retardant additives is the preferred composition.

Two workable compositions can be offered by way of example. One is a mixture having proportions by weight of 75% polyester and 20% polymeric bromoglycidylether mixed with 5% antimony trioxide. A second workable composition is a mixture having proportions by weight of 80% polyester, 16% poly-(2,6-dibromophenylene oxide), and 4% antimony trioxide. Both of these compositions can be extruded in monofilament strands at low temperature, and have the flame-retardant properties required for the practice of this invention.

Generally, in accordance with the present invention, the composition from which the monofilament yarn is extruded can have the proportions by weight of 80% polyester to 20% flame-retardant additive mixture. The latter mixture includes the recommended, or preferred, additive poly-(2,6-dibromophenylene oxide) which can be obtained from the Great Lakes Chemical Corp. under the trade name P064P. Antimony trioxide is mixed with P064P and acts as synergist. The flame-retardant additive mixture is approximately 3 parts P064P to 1 part antimony trioxide, so that these represent 15% and 5% by weight, respectively, of the composition as a whole.

The above percentages should not be taken to be hard and fast figures. The preferred range for the percentage by weight of the polyester runs from 75% to 80%, and, in any event, should not exceed 85%. The preferred range for the percentage by weight of P064P runs from 15% to 25% and, in any event, should not fall below 15%. The preferred range for the percentage by weight of antimony trioxide is 4 to 5%, but should not be below 3%.

In place of polyester (PET), any other thermoplastic, such as PBT, polyolefin, or polyamide, can be used depending on the application and end use as the primary component of the monofilament yarn with good result.

The monofilament yarns for weaving the base fabric are produced by melt-extruding the polyester/flame-retardant blend through a die. The hot filaments are then quenched in a water having a temperature between 110° F. and 170° F. A take-up roll pulls the filaments through the bath at 40 to 50 feet per minute.

The filaments are then double-drawn and single-relaxed through forced hot-air ovens. Optionally, the first draw can be carried out in a hot-water bath. The draw oven temperatures are between 200° F. and 400° F., while the relax oven temperatures are between 350° F. and 450° F. A 5.3% total degree of drawing and approximately 8% relax back is recommended for obtaining the correct filament properties.

We now turn our attention to a discussion of the coatings 4 to be applied to the woven base fabric 5. Polyvinylchloride (PVC), silicone rubber, and acrylics all may be employed as coating materials. Polyvinylchloride can be mixed with a flame-retardant additive.

With particular reference to the use of PVC as a coating agent, the flame-retardant additive is included in a concentration of 2% to 3% by weight. A phosphate-type plasticizer such as 2-ethyl hexyl di-phenyl phosphate is recommended. Silicone rubber is used without a flame-retardant additive.

With further reference to the use of PVC as a coating agent, it is possible to produce this coating in five different colors. Each has 2% to 3% by weight of the phosphate-type flame-retardant additive, 2-ethyl hexyl di-phenyl phosphate. The colors are obtained by the further addition of the coloring agents in the proportions by weight listed below:

| Color | Coloring Agent | Percentage |
|---|---|---|
| White | Titanium dioxide ($TiO_2$) | 5%-6% |
| Orange | Silica encapsulated lead chromate/lead molybdate pigment | 5%-6% |
| Black | Carbon black pigment | 1%-1½% |
| Brown | Brown iron oxide pigment and | 3%-4% |
| | Titanium dioxide | 2%-5% |
| Blue | Phthalocyanine blue pigment and | 1%-2% |
| | Titanium dioxide | 4%-5% |

When the base fabric is ready to be coated, and the components of the desired coating agent mixed if necessary, a doctor blade is used to apply a first thin coat, which quickly dries. A heavy coat is then applied and heat-set at a temperature of 392° F. (200° C.).

After heat-setting, a curing step is performed at a temperature level in accordance with the table below for the various coating agents than can be used.

| Coating Agent | Curing Temperature |
|---|---|
| Acrylics | 338° F. (170° C.) |
| PVC | 345° F. (174° C.) |
| Silicone | 390° F. (199° C.) |

Modifications to the above would be obvious to one skilled in the art without departing from the scope of the invention as defined in the appended claims.

What is claimed is:

1. A flame-retardant rolling-door panel comprising:
   a flame-retardant base fabric, said base fabric woven from a monofilament yarn, said monofilament yarn extruded from a mixture of a thermoplastic material and a flame-retardant additive; and
   a flame-retardant coating agent applied to the surface of said base fabric.

2. A flame-retardant rolling-door panel as claimed in claim 1 wherein said thermoplastic material of said mixture is polyester and said flame-retardant additive of said mixture is polymeric bromoglycidylether mixed with antimony trioxide.

3. A flame-retardant rolling-door panel as claimed in claim 2 wherein said mixture is 75% by weight polyester and 20% by weight polymeric bromoglycidylether mixed with 5% antimony trioxide.

4. A flame-retardant rolling-door panel as claimed in claim 1 wherein said thermoplastic material of said mixture is polyester and said flame-retardant additive of said mixture is poly-(2,6-dibromophenylene oxide) mixed with antimony trioxide.

5. A flame-retardant rolling-door panel as claimed in claim 4 wherein said mixture is 80% by weight polyester, 16% by weight poly-(2,6-dibromophenylene oxide) and 4% by weight antimony trioxide.

6. A flame-retardant rolling-door panel as claimed in claim 4 wherein said mixture is from 75% to 80% by weight polyester, from 15% to 20% by weight poly-(2,6-dibromophenylene oxide), and 5% by weight antimony trioxide.

7. A flame-retardant rolling-door panel as claimed in claim 4 wherein said mixture is no more than 85% by weight polyester, no less than 15% by weight poly-(2,6-dibromophenylene oxide), and no less than 3% antimony trioxide.

8. A flame-retardant rolling-door panel as claimed in claim 1 wherein said mixture 80% by weight polyester and 15% by weight flame-retardant additive, and 5% by weight synergist.

9. A flame-retardant rolling-door panel as claimed in claim 1 wherein said thermoplastic material is chosen from a group consisting of polyester (PET), PBT, polyolefin, and polyamide.

10. A flame-retardant rolling-door panel as claimed in claim 1 wherein said flame-retardant coating agent is chosen from a group consisting of polyvinylchloride (PVC) mixed with a flame-retardant additive, silicone rubber, and acrylics.

11. A flame-retardant rolling-door panel as claimed in claim 1 wherein said flame-retardant coating agent is polyvinylchloride (PVC) mixed with 2% to 3% by weight of a flame-retardant additive.

12. A flame-retardant rolling-door panel as claimed in claim 11 wherein said flame-retardant additive is a phosphate-type plasticizer.

13. A flame-retardant rolling-door panel as claimed in claim 12 wherein said phosphate-type plasticizer is 2-ethyl hexyl diphenyl phosphate.

14. A flame-retardant rolling-door panel as claimed in claim 11 wherein said flame-retardant additive is 2-ethyl/hexyl di-phenyl phosphate.

15. A flame-retardant rolling-door panel as claimed in claim 1 wherein said flame-retardant coating agent is polyvinylchloride mixed with 2% to 3% by weight of 2-ethyl hexyl di-phenyl phosphate.

16. A flame-retardant rolling-door panel as claimed in claim 15 wherein said flame-retardant coating agent further comprises 5% to 6% by weight of titanium dioxide, so that said flame-retardant coating agent will acquire a white color.

17. A flame-retardant rolling-door panel as claimed in claim 15 wherein said flame-retardant coating agent further comprises 5% to 6% by weight of silica encapsulated lead chromate/lead molybdate pigment, so that said flame-retardant coating agent will acquire an orange color.

18. A flame-retardant rolling-door panel as claimed in claim 15 wherein said flame-retardant coating agent further comprises 1% to 1½% by weight of carbon black pigment, so that said flame-retardant coating agent will acquire a black color.

19. A flame-retardant rolling-door panel as claimed in claim 15 wherein said flame-retardant coating agent further comprises 3% to 4% by weight of brown iron oxide pigment and 2% to 5% by weight of titanium dioxide, so that said flame-retardant coating agent will acquire a brown color.

20. A flame-retardant rolling-door panel as claimed in claim 15 wherein said flame-retardant coating agent further comprises 1% to 2% by weight of phthalocyanine blue pigment and 4% to 5% by weight of titanium dioxide, so that said flame-retardant coating agent will acquire a blue color.

* * * * *